US012587370B2

(12) United States Patent
Cho et al.

(10) Patent No.: US 12,587,370 B2
(45) Date of Patent: Mar. 24, 2026

(54) IDENTIFIERS FOR COLLECTIVE MANAGEMENT OF GROUPS OF INFORMATION HANDLING SYSTEMS

(71) Applicant: Dell Products L.P., Round Rock, TX (US)

(72) Inventors: Eugene David Cho, Austin, TX (US); Mukund P. Khatri, Austin, TX (US); Senthil Ponnuswamy, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 129 days.

(21) Appl. No.: 18/428,394

(22) Filed: Jan. 31, 2024

(65) Prior Publication Data

US 2025/0247214 A1      Jul. 31, 2025

(51) Int. Cl.
| | |
|---|---|
| *H04L 9/40* | (2022.01) |
| *G06F 11/30* | (2006.01) |
| *H04L 9/08* | (2006.01) |

(52) U.S. Cl.
CPC ........ *H04L 9/0838* (2013.01); *G06F 11/3006* (2013.01); *H04L 9/0825* (2013.01)

(58) Field of Classification Search
CPC ... H04L 9/0838; H04L 9/0825; G06F 11/3006
See application file for complete search history.

(56) References Cited

U.S. PATENT DOCUMENTS

| | | | | |
|---|---|---|---|---|
| 2022/0394336 | A1* | 12/2022 | Christakopoulou | ........................ H04N 21/252 |
| 2023/0344716 | A1* | 10/2023 | Yarvis | ................. H04L 41/0886 |
| 2025/0077638 | A1* | 3/2025 | Chopra | .................. G06F 21/44 |

* cited by examiner

*Primary Examiner* — Thaddeus J Plecha
(74) *Attorney, Agent, or Firm* — Fogarty LLP

(57) ABSTRACT

Systems and methods include an IHS (Information Handling System) that is a member of a computing cluster and that is configured to participate in collective management of the cluster, including generating a unique identifier for collective use and identification of the cluster. Cluster management functions of the IHS are configured to determine when the addition of another IHS as a member of the computing cluster requires an update to a cluster identifier that is used to task the computing cluster. When an update to the cluster identifier is required, the cluster management functions generate an updated cluster identifier that is amalgamation of identifiers of each member of the computing cluster and the updated cluster identity is transmitted to cluster members.

20 Claims, 7 Drawing Sheets

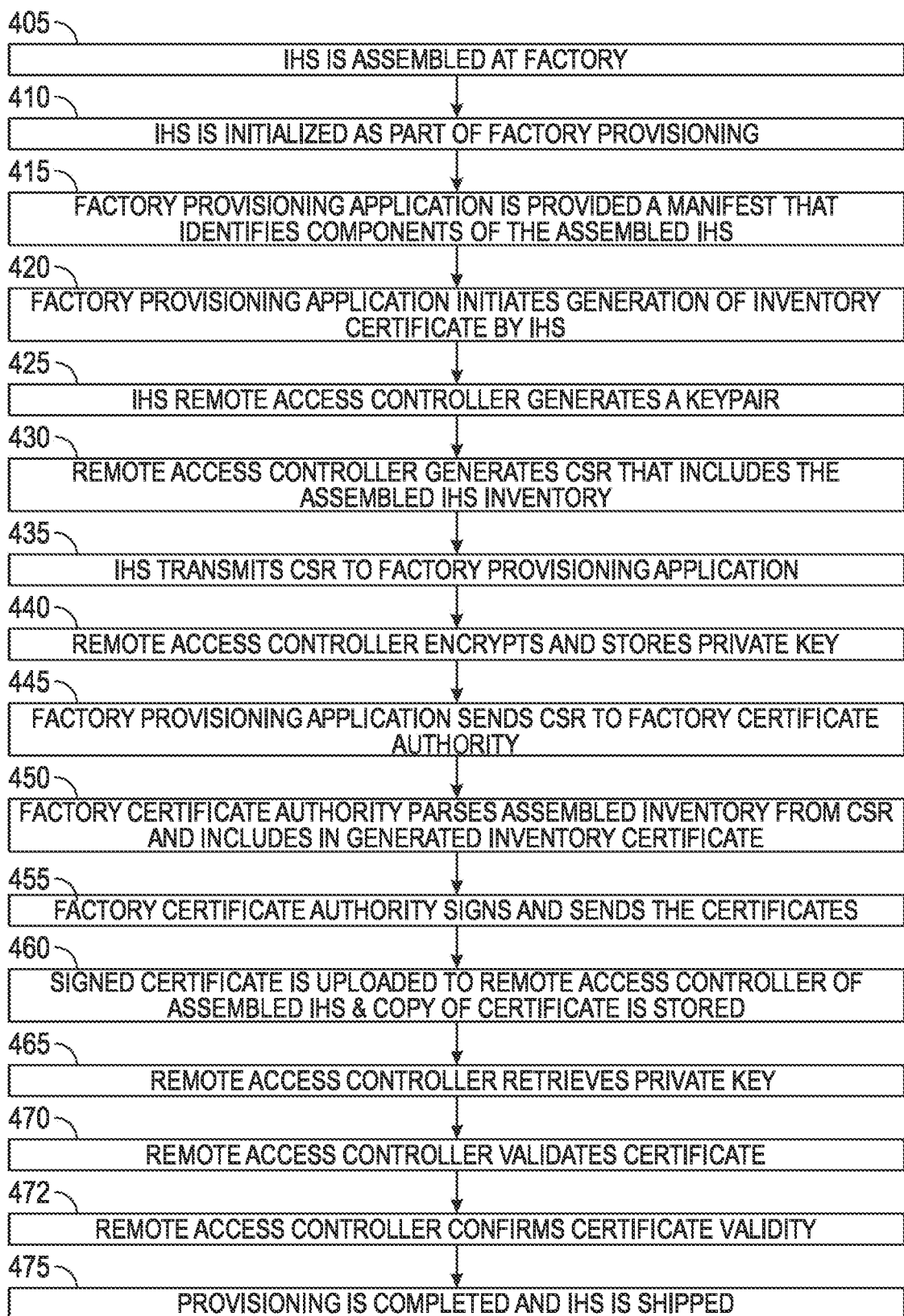

405 — IHS IS ASSEMBLED AT FACTORY

410 — IHS IS INITIALIZED AS PART OF FACTORY PROVISIONING

415 — FACTORY PROVISIONING APPLICATION IS PROVIDED A MANIFEST THAT IDENTIFIES COMPONENTS OF THE ASSEMBLED IHS

420 — FACTORY PROVISIONING APPLICATION INITIATES GENERATION OF INVENTORY CERTIFICATE BY IHS

425 — IHS REMOTE ACCESS CONTROLLER GENERATES A KEYPAIR

430 — REMOTE ACCESS CONTROLLER GENERATES CSR THAT INCLUDES THE ASSEMBLED IHS INVENTORY

435 — IHS TRANSMITS CSR TO FACTORY PROVISIONING APPLICATION

440 — REMOTE ACCESS CONTROLLER ENCRYPTS AND STORES PRIVATE KEY

445 — FACTORY PROVISIONING APPLICATION SENDS CSR TO FACTORY CERTIFICATE AUTHORITY

450 — FACTORY CERTIFICATE AUTHORITY PARSES ASSEMBLED INVENTORY FROM CSR AND INCLUDES IN GENERATED INVENTORY CERTIFICATE

455 — FACTORY CERTIFICATE AUTHORITY SIGNS AND SENDS THE CERTIFICATES

460 — SIGNED CERTIFICATE IS UPLOADED TO REMOTE ACCESS CONTROLLER OF ASSEMBLED IHS & COPY OF CERTIFICATE IS STORED

465 — REMOTE ACCESS CONTROLLER RETRIEVES PRIVATE KEY

470 — REMOTE ACCESS CONTROLLER VALIDATES CERTIFICATE

472 — REMOTE ACCESS CONTROLLER CONFIRMS CERTIFICATE VALIDITY

475 — PROVISIONING IS COMPLETED AND IHS IS SHIPPED

FIG. 4

IDENTIFIERS FOR COLLECTIVE MANAGEMENT OF GROUPS OF INFORMATION HANDLING SYSTEMS

FIELD

The present disclosure relates generally to Information Handling Systems (IHSs), and relates more particularly to supporting the operation of groups of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. Each server IHS within a data center may support a wide variety of possible hardware and software configurations. For instance, each individual server IHS may be manufactured accordingly to customized hardware and software configurations requested by a customer. In some instances, IHSs, such as rack-mounted servers may be grouped into computing clusters that may also include other types of hardware components, such as network switches and power supplies that can enhance the capabilities of the computing cluster. Each member of the computing cluster is a dedicated component of the cluster such that the components of the cluster may be collectively tasked and operated as a single computing system.

SUMMARY

In various embodiments, a first IHS (Information Handling System) is a member of a computing cluster and may include: one or more processors; one or more memory devices coupled to the processors, the memory devices storing computer-readable instructions that, upon execution by the processors, cause cluster management functions of the first IHS to: determine when the addition of the second IHS as a member of the computing cluster requires an update to a cluster identifier that is used to task the computing cluster; when an update to the cluster identifier is required, generate an updated cluster identifier, wherein the generated updated to the cluster identifier comprises an amalgamation of identifiers of each member of the computing cluster; and transmit the updated cluster identifier to the second IHS.

In some embodiments, the updated cluster identifier is generated through inputs to a key derivation function that comprise the identifiers of each member of the computing cluster. In some embodiments, a plurality of operators specify whether the identifier of each member of the computing cluster is used as in input to the key derivation function. In some embodiments, the operators specify an identifier of a member of the computing cluster as an unconditional input to the key derivation function used to generate the updated cluster identifier. In some embodiments, the operators specify an identifier of a member of the computing cluster as an conditional input to the key derivation function used to generate the updated cluster identifier. In some embodiments, the identifiers of each member of the computing cluster comprise unique identifiers assigned by a manufacturer of each respective member of the computing cluster. In some embodiments, the identifiers of each member of the computing cluster comprise unique identifiers specified in a factory-provisioned certificate that specifies factory-installed hardware of each respective member of the computing cluster. In some embodiments, the identifiers specified in a factory-provisioned certificate that specifies factory-installed hardware of each respective member comprise a digital signature generated based on identifiers of factory-installed hardware of the respective member of the computing cluster. In some embodiments, the digital signature is signed by a manufacturer of the respective member of the computing cluster. In some embodiments, the certificate comprises a public key of a keypair generated by the respect member of the computing cluster, wherein the public key is endorsed by the manufacture and used to validate the identifiers of each respective member of the computing cluster. Some embodiments may further include a remote access controller comprising one or more logic units and further comprising one or more memory devices storing computer-readable instructions that, upon execution by the logic units, cause the remote access controller to generate the indication of the addition of the second IHS to the computing cluster. In some embodiments, the update to the cluster identifier is required due to upgraded capabilities of the computing cluster due to the addition of the second IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

FIG. 4 is a flowchart describing certain steps of a method, according to some embodiments, for assembly and provisioning of an IHS in a manner that supports generating identifiers used in collective management of computing clusters that include the IHS.

DETAILED DESCRIPTION

Figure 1:
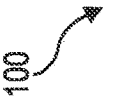
FIG. 1 is a diagram illustrating certain components of a computing cluster, according to some embodiments, that includes multiple IHSs.

FIG. 1 is a block diagram illustrating certain components of a computing cluster 100 comprising one or more compute sleds 105*a-n* and one or more storage sleds 115*a-n* that may be configured to implement the systems and methods described herein for supporting collective management of such clusters. Embodiments of computing cluster 100 may include a wide variety of different hardware configurations. Such variations in hardware configuration may result from computing cluster 100 being factory configured to include components specified by a customer that has contracted for manufacture, provisioning and delivery of the computing cluster 100. Configured in this manner, a computing cluster 100 may be tasked as a single entity that combines the capabilities of the sleds 105*a-n*, sleds 115*a-n* and/or other hardware that is included in the computing cluster 100, such as network switches 140 and power supplies 135.

All of the hardware components of the computing cluster 100 may be installed within a rack 100 may include one or more slots that each receive an individual sled (that may be additionally or alternatively referred to as a server, node and/or blade), such as compute sleds 105*a-n* and storage sleds 115*a-n*. A rack may support a variety of different numbers, sizes (e.g., 1RU, 2RU) and physical configurations of slots. Computing cluster 100 embodiments may support additional types of sleds that may be installed within a rack and provide various types of storage and/or processing capabilities. Sleds may be individually installed and removed from a rack, thus allowing the computing and storage capabilities of a rack, and thus of a computing cluster 100, to be reconfigured, in many cases without affecting the operation of the other hardware installed in the rack.

The modular architecture provided by the rack allows for certain resources, such as cooling, power and network bandwidth, to be shared by the compute sleds 105*a-n* and storage sleds 115*a-n* or other hardware installed in the rack, thus providing efficiency improvements and supporting greater computational loads. Rack may provide all or part of the cooling utilized by sleds 105*a-n*, 115*a-n* of a computing cluster 100. For airflow cooling, a rack may include one or more banks of cooling fans that may be operated to ventilate heated air from within the hardware that is installed within the rack. In some embodiments, rack may include liquid cooling manifolds that can be connected to IHSs or other hardware in providing these components with liquid cooling capabilities.

Figure 2:
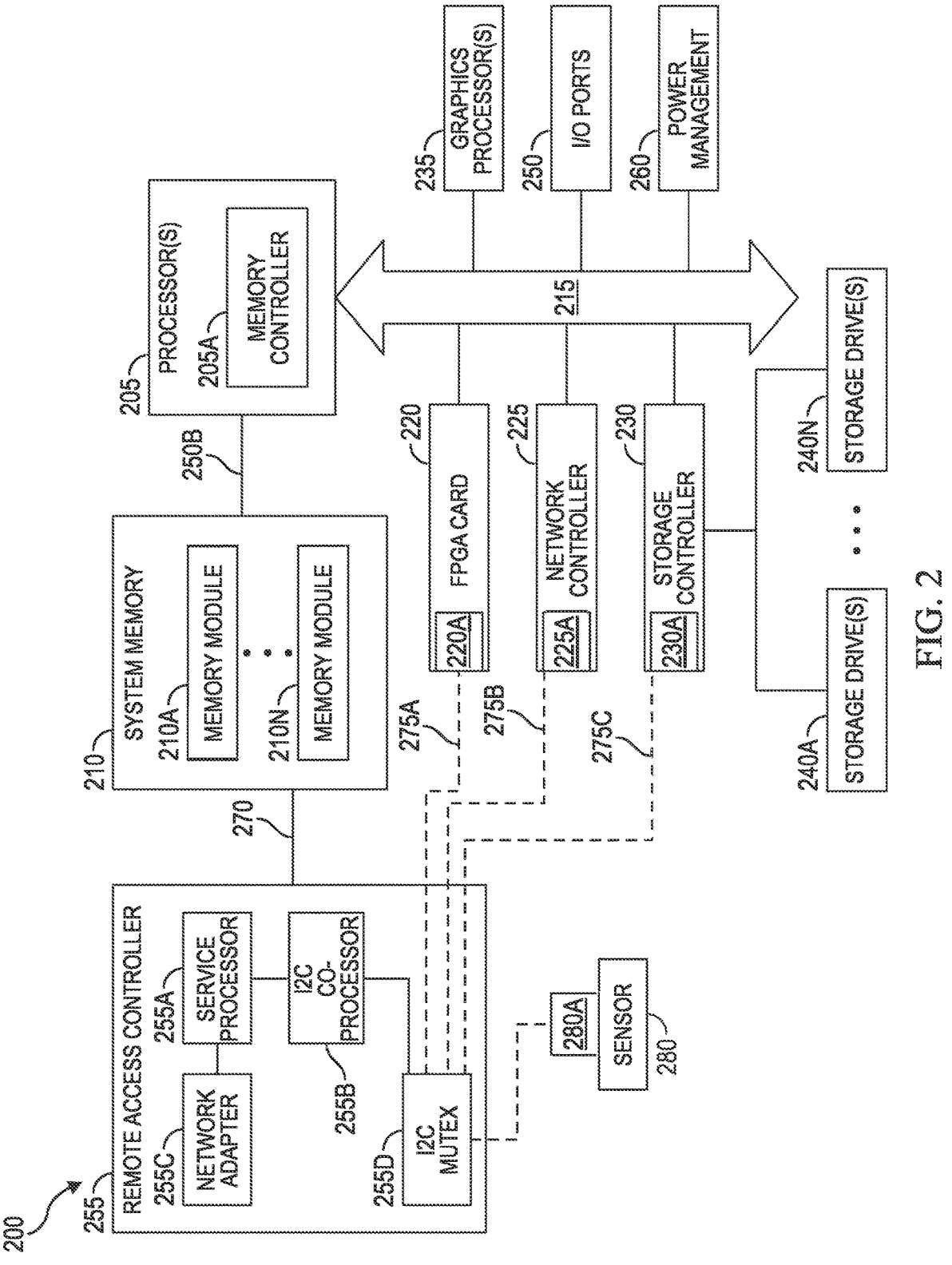
FIG. 2 is a diagram illustrating certain components of an IHS configured, according to some embodiments, for generating identifiers used in collective management of computing clusters that include the IHS.

In certain embodiments, a compute sled 105*a-n* may be an IHS such as described with regard to IHS 200 of FIG. 2. A compute sled 105*a-n* may provide computational processing resources that may be used to support a variety of e-commerce, multimedia, business and scientific computing applications, such as services provided via a cloud implementation. Compute sleds 105*a-n* are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105*a-n* may be configured for general-purpose computing or may be optimized for specific computing tasks.

As illustrated, each compute sled 105*a-n* includes a remote access controller (RAC) 110*a-n*. As described in additional detail with regard to FIG. 2, remote access controller 110*a-n* provides capabilities for remote monitoring and management of compute sled 105*a-n*. In support of these monitoring and management functions, remote access controllers 110*a-n* may utilize both in-band and sideband (i.e., out-of-band) communications by compute sled 105*a-n*. Remote access controllers 110*a-n* may collect various types of sensor data, such as collecting temperature sensor readings that are used in support of airflow cooling of the sleds 105*a-n*, 115*a-n*. In addition, each remote access controller 110*a-n* may implement various monitoring and administrative functions related to compute sleds 105*a-n* that utilize sideband bus connections with various internal components of the respective compute sleds 105*a-n*.

In some embodiments, each compute sled 105*a-n* installed in chassis 100 may be uniquely identified based on a code or other identifier that may be permanently encoded in a non-volatile memory of a respective compute sled 105*a-n* by its manufacturer. As described below, during a provisioning phase of the factory assembly of chassis 100, a signed certificate that specifies the hardware included in a computing cluster 100, such as through such identifiers of compute sleds 105*a-n* that may be stored in a non-volatile memory accessed by a remote access controller 110*a-n* of a compute sled 105*a-n*. Using this signed certificate, a customer may validate that the hardware components of computing cluster 100 are the same components that were manufactured and provisioned for the customer.

Implementing computing clusters 100 that span multiple processing components (e.g., 105*a-n*, 115*a-n*) may be aided by high-speed data links between these processing components, such as PCIe connections that form one or more distinct PCIe switch fabrics 160 that may implemented by network switches 140 and PCIe switches 135*a-n*, 165*a-n* installed in the IHSs 105*a-n*, 115*a-n* that are members of the computing cluster 100. These high-speed data links may be used to support software that operates spanning multiple processing, networking and storage components of a computing cluster 100. In embodiments, a computing cluster 100 may be tasked and operated as a single component, without regard to the individual hardware components that are members of the computing cluster 100. As described in additional detail below, in embodiments, the computing cluster 100 may implement procedures for identification, and thus tasking, of the computing cluster by other computing systems.

As illustrated, computing cluster 100 may also include one or more storage sleds 115*a-n* that may be installed within one or more slots of a rack, in a similar manner to compute sleds 105*a-n*. Each of the individual storage sleds 115*a-n* may include various different numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. As illustrated, each storage sled 115*a-n* includes a remote access controller (RAC) 120*a-n* provides capabilities for remote monitoring and management of respective storage sleds 115*a-n*. In some embodiments, each of the storage sleds 115*a-n* may include a PCIe switch 165*a-n* for use in coupling the sleds to a switch fabric 160, by which the storage sleds may interface with other members of the computing cluster 100. In some embodiments, each storage sled 115*a-n* may be uniquely identified based on a code or other identifier that may be permanently encoded in a non-volatile memory of the respective storage sled 115*a-n* by its manufacturer.

As illustrated, the computing cluster 100 of FIG. 1 includes a network switch 140 that may provide network access to the sleds 105*a-n*, 115*a-n* of the cluster. Network switch 140 may include various switches, adapters, controllers and couplings used to connect computing cluster 100 to a network and/or to local IHSs, such as another computing cluster 100 according to embodiments. In some embodiments, a network switch 140 may be uniquely identified based on a code or other identifier that may be permanently encoded in a non-volatile memory of the network switch 140 by its manufacturer. Whereas the illustrated embodiment of FIG. 1 includes a single network switch in a computing cluster 100, different embodiments may operate using different numbers of network switches.

In some embodiments, network switch 140 may be a PCIe switch 265*a-b* that implements switch fabric 160 and operates as an I/O controller for PCIe communications, such as TLPs (Transaction Layer Packets), that are transmitted between the hardware components (e.g., compute sleds 105*a-n* and storage sleds 115*a-n*) that are members of the same computing cluster 100. In addition to serving as I/O controllers that route PCIe traffic, a PCIe network switch 140 includes switching logic that can be used to expand the number of PCIe connections that are supported in the switch fabric 160. For instance, a PCIe network switch 140 may multiply the number of PCIe lanes available via the switch fabric 160. As described in additional detail below, such capabilities may be utilized in establishing secure channels through which the members of the computing cluster 100 may securely interoperate in collective cluster management operations, such as support for a unified identification, such as a cluster ID, used for tasking and operating the computing cluster 100 as a single entity, and thus without regard or knowledge of the hardware components that are members of the computing cluster.

In some embodiments, computing cluster 100 may include one or more power supply units 135 that provides the components of the computing cluster with various levels of DC power from an AC power source or from power delivered via a power system that may be provided by a rack within which the computing cluster 100 is installed. In certain embodiments, power supply unit 135 may be implemented within a sled that may provide the computing cluster 100 with multiple redundant, hot-swappable power supply units. In some embodiments, a power supply unit 135 may be uniquely identified based on a code or other identifier that may be permanently encoded in a non-volatile memory of the power supply unit 135 by its manufacturer.

In addition to the data storage capabilities provided by storage sleds 115*a-n*, computing cluster 100 include other storage resources that may be installed within a rack housing the computing cluster 100, such as within a storage blade. In certain scenarios, such storage resources 155 may be accessed via a SAS expander 150 that is coupled to the switch fabric 160 of the computing cluster 100. The SAS expander 150 may support connections to a number of JBOD (Just a Bunch Of Disks) storage drives 155 that may be configured and managed individually and without implementing data redundancy across the various drives 155. In some embodiments, a SAS expander 150 and storage drive 155 may be uniquely identified based on a code or other identifier that may be permanently encoded in a non-volatile memory of the SAS expander 150 or storage drive 155 by its respective manufacturer.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein for generating identifiers used in collective management of clusters that include the IHS 200, where the IHS 200 may be designated leader or may be a participant in the collective management of the computing cluster 100. It should be appreciated that although the embodiments described herein may describe an IHS that is a compute sled or similar computing component that may be deployed within slots of rack, other embodiments may be utilized with other types of IHSs that may also be members of a computing cluster 100 according to embodiments. In the illustrative embodiment of FIG. 2, IHS 200 may be a computing component, such as compute sled 105*a-n* or other type of server, such as an 1RU server installed within a 2RU chassis, that is configured to share infrastructure resources provided by a rack.

As described, an IHS 200 may be assembled and provisioned according to customized specifications provided by a customer. The IHS 200 of FIG. 2 may be a compute sled, such as compute sleds 105*a-n* of FIG. 1, that may be installed within a rack in a data center. Installed in this manner, IHS 200 may utilize shared power, network and cooling resources provided by the rack. Embodiments of IHS 200 may include a wide variety of different hardware configurations. Such variations in hardware configuration may result from IHS 200 being factory assembled to include components specified by a customer that has contracted for manufacture and delivery of IHS 200. IHS 200 may include capabilities that allow a customer to validate that the hardware components of IHS 200 are the same hardware components that were installed at the factory during its manufacture, where these validations of the IHS hardware may be initially completed using a factory-provisioned inventory certificate. As described in additional detail below, IHS 200 may include capabilities that allow a customer to validate the hardware during initialization of the IHS 200 as being the same factory installed and provisioned hardware that was supplied to the customer.

IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications. In some embodiments, each of the processors 205 may be uniquely identified based on a code or other identifier that may be permanently encoded in a respective processor 205 by its manufacturer. As described below, embodiments support validation of processors 205 as being the same processors that were installed at the factory during the manufacture of IHS 200.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b. The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory. In some embodiments, each of the memory modules 210a-n may be uniquely identified based on a code or other identifier that may be permanently encoded in a respective memory module 210a-n by its manufacturer. As described below, embodiments support validation of memory modules 210a-n as being the same memory modules that were installed at the factory during the manufacture of IHS 200.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more in-band buses 215. Various embodiments may utilize any number of buses to provide the illustrated pathways served by in-band bus 215. In certain embodiments, in-band bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources and/or other peripheral components.

As illustrated, IHS 200 may include one or more FPGA (Field-Programmable Gate Array) cards 220. Each of the FPGA card 220 supported by IHS 200 may include various processing and memory resources, in addition to an FPGA logic unit that may include circuits that can be reconfigured after deployment of IHS 200 through programming functions supported by the FPGA card 220. Through such reprogramming of such logic units, each individual FGPA card 220 may be optimized to perform specific processing tasks, such as specific signal processing, security, data mining, and artificial intelligence functions, and/or to support specific hardware coupled to IHS 200. In some embodiments, a single FPGA card 220 may include multiple FPGA logic units, each of which may be separately programmed to implement different computing operations, such as in computing different operations that are being offloaded from processor 205. The FPGA card 220 may also include a management controller 220a that may support interoperation with the remote access controller 255 via a sideband device management bus 275a. In some embodiments, each of the FPGA cards 220 installed in IHS 200 may be uniquely identified based on a code or other identifier that may be permanently encoded in the FPGA card 220 by its manufacturer. As described below, embodiments support validation of FPGA card 220 as being the same FPGA card that was installed at the factory during the manufacture of IHS 200.

Processor(s) 205 may also be coupled to one or more network controllers 225 via in-band bus 215, such as provided by a Network Interface Controller (NIC) that allows the IHS 200 to communicate via an external network, such as the Internet or a LAN. In some embodiments, network controllers 225 may include a replaceable expansion card or adapter that is coupled to a motherboard connector of IHS 200. In some embodiments, network controllers 225 may be uniquely identified based on a code or other identifier, such as a MAC address, that may be permanently encoded in a non-volatile memory of the network controller by its manufacturer. As described below, embodiments support validation of a network controller 225 as being the same network controller that was installed at the factory during the manufacture of IHS 200, or as being a trusted network controller installed by the customer. In some embodiments, a network controller 225 may be a PCIe switch, such as PCIe switches 165a-n described in computing cluster 100, while in other embodiments, the network controllers 255 of IHS 100 may include both a PCIe switch and a separate ethernet network controller. As described, a PCIe switch may be used by the IHS 200 to interface with other members of a computing cluster 100 via a switch fabric 160, such as the use of a selected PCIe lane for cluster management communications used in the collective management of the computing cluster, where the IHS 200 may be designated leader or may be a participant in the collective management of the computing cluster 100.

IHS 200 may include one or more storage controllers 230 that may be utilized to access storage drives 240a-n that are accessible via a rack in which IHS 100 is installed. Storage controller 230 may provide support for RAID (Redundant Array of Independent Disks) configurations of logical and physical storage drives 240a-n. In some embodiments, storage controller 230 may be an HBA (Host Bus Adapter) that provide more limited capabilities in accessing physical storage drives 240a-n. In some embodiments, storage drives 240a-n may be replaceable, hot-swappable storage devices that are installed within bays provided by the chassis in which IHS 200 is installed. In embodiments where storage drives 240a-n are hot-swappable devices that are received by bays of chassis, the storage drives 240a-n may be coupled to IHS 200 via couplings between the bays of the chassis and a midplane of IHS 200. In some embodiments storage drives 240a-n may also be accessed by other IHSs that are also installed within the same chassis as IHS 100. Storage drives 240a-n may include SAS (Serial Attached SCSI) magnetic disk drives, SATA (Serial Advanced Technology Attachment) magnetic disk drives, solid-state drives (SSDs) and other types of storage drives in various combinations. In some embodiments, each individual storage controller 230 and storage drive 240a-n may be uniquely identified based on a code or other identifier that may be permanently encoded in a non-volatile memory of the component by its manufacturer. As described below, embodiments support validation of storage controller 230 and storage drives 240a-n as being the same storage controller and storage drives that were installed at the factory during the manufacture of IHS 200.

A variety of additional components may be coupled to processor(s) 205 via in-band bus 215. For instance, processor(s) 205 may also be coupled to a power management unit 260 that may interface with the power system unit 135 of the computing cluster 100 in which an IHS may be a member. In certain embodiments, a graphics processor 235 may be comprised within one or more video or graphics cards, or an embedded controller, installed as components of the IHS 200. In certain embodiments, graphics processor 235 may be an integrated component of the remote access controller 255 and may be utilized to support the display of diagnostic and administrative interfaces related to IHS 200 via display devices that are coupled, either directly or remotely, to remote access controller 255. In some embodiments, components such as power management unit 260 and graphics processor 235 may also be uniquely identified based on a code or other identifier that may be permanently encoded in a non-volatile memory of these components by their respective manufacturer. As described below, embodiments support validation of these components as being components that were installed at the factory during the manufacture of IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255. As described in additional detail below, in some embodiments, BIOS may be configured to identify hardware components that are detected as being currently installed in IHS 200. In such instances, the BIOS may support queries that provide the described unique identifiers that have been associated with each of these detected hardware components by their respective manufacturers.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As described, IHS 200 may include a remote access controller 255 that supports remote management of IHS 200 and of various internal components of IHS 200. In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the operating system of IHS 200 (i.e., in a bare-metal state). In some embodiments, certain operations of the remote access controller 225, such as the described inventory certificate generation and validation operations, may operate using validated instructions, and thus within the root of trust of IHS 200.

As part of the management capabilities of a remote access controller 255, embodiments may include capabilities for detecting the addition or removal of a hardware device from a computing cluster of which IHS 200 is a member. In some embodiments, the remote access controller 255 may interface with remote management tools that may provide notifications of component being added or removed from a computing cluster 100. In some embodiments, sideband communication capabilities of the remote access controller 255 may be utilized in detecting the coupling of components to a computing cluster, such as the detection of broadcasts by new components on management busses monitored by the remote access controller 255.

In some embodiments, remote access controller 255 may be uniquely identified based on a code or other identifier that may be permanently encoded in a non-volatile memory of the remote access controller 255 by its manufacturer. As described below, embodiments support validation of remote access controller 255 as being the same controller that was installed at the factory during the manufacture of IHS 200. Also as described below, during a provisioning phase of the factory assembly of IHS 200, a signed certificate that specifies factory installed hardware components of IHS 200 that were installed during manufacture of the IHS 200 may be stored in a non-volatile memory that is accessed by remote access controller 255. Using this signed inventory certificate stored by the remote access controller 255, a customer may validate that the detected hardware components of IHS 200 are the same hardware components that were installed at the factory during manufacture of IHS 200.

In support of the capabilities for validating the detected hardware components of IHS 200 against the inventory information that is specified in a signed inventory certificate, remote access controller 255 may include various cryptographic capabilities. For instance, remote access controller 255 may include capabilities for key generation such that remote access controller may generate keypairs that include a public key and a corresponding private key. As described in additional detail below, using generated keypairs, remote access controller 255 may digitally sign inventory information collected during the factory assembly of IHS 200 such that the integrity of this signed inventory information may be validated at a later time using the public key by a customer that has purchased IHS 200. Using these cryptographic capabilities of the remote access controller, the factory installed inventory information that is included in an inventory certificate may be anchored to a specific remote access controller 255, since the keypair used to sign the inventory information is signed using the private key that is generated and maintained by the remote access controller 255.

In some embodiments, the cryptographic capabilities of remote access controller 255 may also include safeguards for encrypting any private keys that are generated by the remote access controller and further anchoring them to components within the root of trust of IHS 200. For instance, a remote access controller 255 may include capabilities for accessing hardware root key (HRK) capabilities of IHS 200, such as for encrypting the private key of the keypair generated by the remote access controller. In some embodiments, the HRK may include a root key that is programmed into a fuse bank, or other immutable memory such as one-time programmable registers, during factory provisioning of IHS 200. The root key may be provided by a factory certificate authority, such as described below. By encrypting a private key using the hardware root key of IHS 200, the hardware inventory information that is signed using this private key is further anchored to the root of trust of IHS 200. If a root of trust cannot be established through validation of the remote access controller cryptographic functions that are used to access the hardware root key, the private key used to sign inventory information cannot be retrieved. In some embodiments, the private key that is encrypted by the remote access controller using the HRK may be stored to a replay protected memory block (RPMB) that is accessed using security protocols that require all commands accessing the RPMB to be digitally signed using a symmetric key and that include a nonce or other such value that prevents use of commands in replay attacks. Stored to an RPMG, the encrypted private key can only be retrieved by a component within the root of trust of IHS 200, such as the remote access controller 255.

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as non-standard hardware 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or micro-controller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a which may be referred to as modular field replaceable units (FRUs).

As illustrated, the I2C co-processor 255b may interface with the individual managed devices 220, 225, 230, 280 via individual sideband I2C buses 275a-d selected through the operation of an I2C multiplexer 255d. Via switching operations by the I2C multiplexer 255d, a sideband bus connection 275a-d may be established by a direct coupling between the I2C co-processor 255b and an individual managed device 220, 225, 230, 280. In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
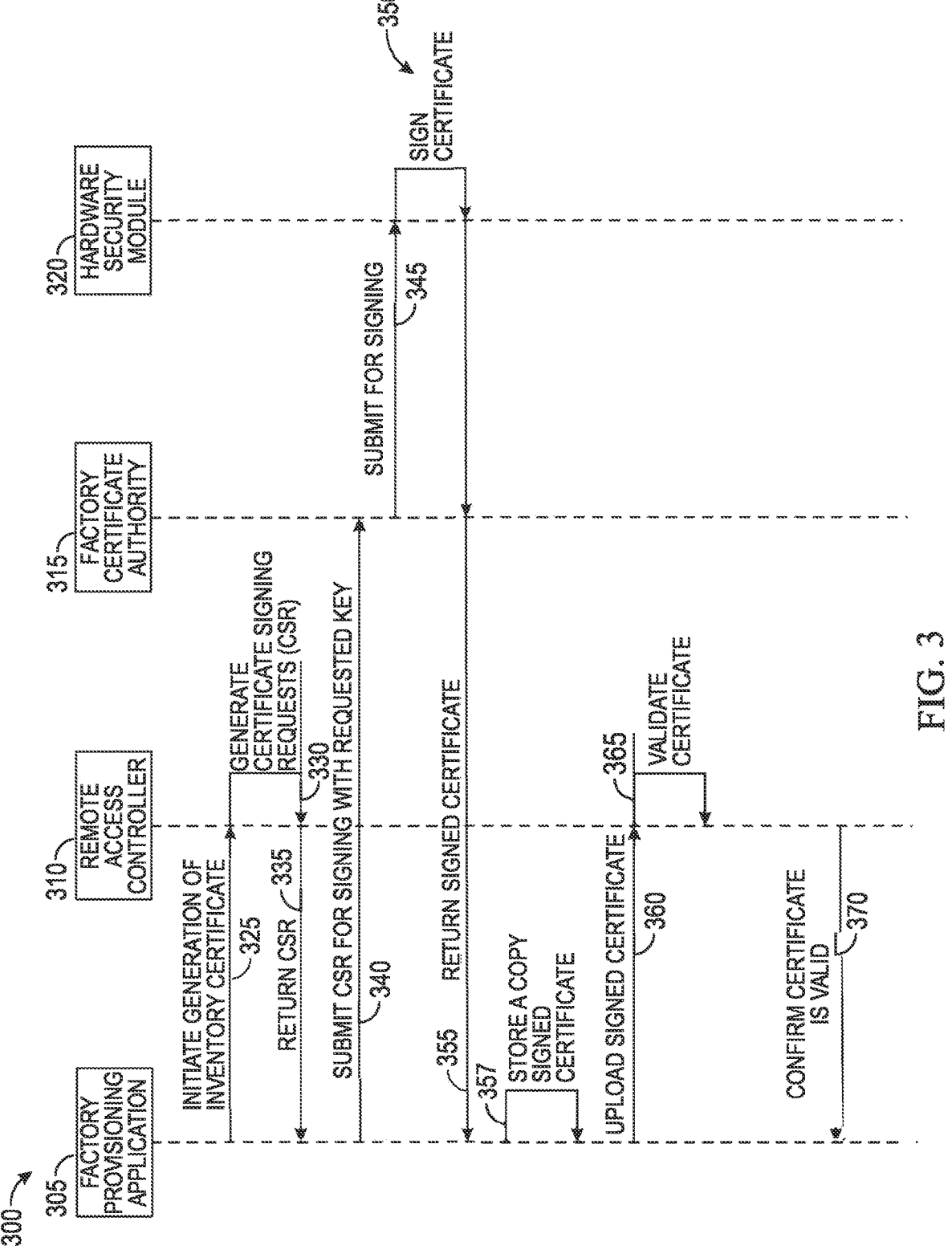
FIG. 3 is a swim lane diagram illustrating certain responsibilities of components of a system configured according to certain embodiments for factory provisioning of an IHS in a manner that supports generating identifiers used in collective management of computing clusters that include IHSs.

FIG. 3 is a swim lane diagram illustrating certain responsibilities of components of a system configured according to certain embodiments for factory provisioning of an IHS in a manner that supports validation of the hardware of the IHS as factory-installed, thus supporting validation of the IHS as an authentic member of a computing cluster 100 that can participate in generating identifiers used by the computing cluster. FIG. 4 is a flowchart describing certain steps of a method, according to some embodiments, for factory provisioning of an IHS in a manner that supports validation of hardware of the IHS as factory-installed, thus also supporting validation of the IHS as an authentic member of computing cluster 100 that can participate in generating identifiers used by the computing cluster.

Some embodiments of the method of FIG. 4 may begin, at block 405, with the factory assembly of an IHS, such as the assembly of a server described with regard to FIGS. 1 and 2. In some instances, an IHS may be manufactured using a factory process that includes multiple phases of assembly, validation and provisioning that must be completed before the IHS is supplied to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS.

Once the assembly of an IHS has been completed, the IHS may be subjected to manual and automated inspections that confirm the IHS has been properly assembled and does not include any defects. After confirming an IHS has been assembled without any manufacturing defects, at block 410, factory provisioning of the IHS may be initiated. In some instances, the provisioning of an IHS at the factory may include various stages that may include stages for loading of firmware, configuring hardware components, and installing an operating system and other software. As indicated in FIG. 3, various aspects of this factory provisioning process may be conducted using a factory provisioning application 305, where this factory provisioning application may run on one or more servers and may interface with an IHS that is being provisioned once a requisite amount of firmware and software has been installed to the IHS.

As described, a manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. At block 415, a manifest generated during assembly of an IHS is provided to the factory provisioning application 305 that is being used to provision the assembled IHS. Based on this hardware manifest information, at block 420, the factory provisioning application 305 may also initiate the generation of an inventory certificate that may be used to validate that the detected hardware components of the IHS are the same hardware components that were installed during the factory assembly of the IHS. As described in additional detail below, validation of the IHS hardware as factory installed using a factory-provisioned inventory certificate, where this certificate may be augmented through the use of a delta certificates that can be used to validate any modifications to the factory installed hardware of the IHS.

As described with regard to FIGS. 1 and 2, an IHS may include a remote access controller that provides capabilities for remote management of an IHS, where these remote management capabilities may include sideband management of various hardware components of an IHS. As indicated in FIG. 3, the generation of an inventory certificate for a newly assembled IHS, at 325, may be initiated via a request from the factory provisioning application 305 to the remote access controller 310 of the IHS. As described with regard to FIG. 2, a remote access controller of an IHS may include cryptographic capabilities that operate within the root of trust of the IHS and that include the ability to generate cryptographic keypairs. Utilizing such cryptographic capabilities, at block 425, the remote access controller 310 initiates the generation of an inventory certificate by generating a cryptographic key pair for use in validating the authenticity of inventory information that is included in an inventory certificate.

At block 430 and at 330, the remote access controller 310 generates a certificate signing request (CSR) for a digital identity certificate, where the request specifies the public key of the key pair generated by the remote access controller and also specifies the factory installed hardware inventory from the manifest that was generated during assembly of the IHS. The factory installed hardware inventory information included in the CSR may be signed by the remote access controller using the private key from the generated keypair. At block 435 and at 335, the CSR for the requested inventory certificate is transmitted to the factory provisioning application 305 by the remote access controller 310. At block 440, the remote access controller safeguards the private key from the generated key pair. In some embodiments, the remote access controller may encrypt the private key using the hardware root key (HRK) of the IHS and may store the encrypted key to a protected memory, such as the replay protected memory block that is described with regard to FIG. 2.

Upon receiving the certificate signing request from the remote access controller 310, at block 445 and at 340, the factory provisioning application 305 submits the CSR for signing by a factory certificate authority 315. In some embodiments, the factory provisioning application 305 specifies a factory key to be used by the factory certificate authority 315 in signing the inventory certificate. For instance, the factory provisioning application may include the name of a trusted certificate associated with a factory key as an attribute of the CSR that is transmitted to the factory certificate authority 315. Upon receipt of the CSR, at block 450, the factory certificate authority parses from the CSR: the hardware inventory information, the public key generated by the remote access controller and the information specifying the requested signing key. Based on the information parsed from the CSR, the factory certificate authority generates a digital identity certificate, referred to herein as an inventory certificate, that is associated with the public key provided by the remote access controller and that specifies the factory installed hardware inventory of the IHS. As part of generating the inventory certificate, the factory certificate authority may utilize the public key included in the CSR to generate a cryptographic challenge that establishes the remote access controller's 310 possession of the private key that corresponds to this public key.

As indicated in FIG. 3, at 345, the factory certificate authority 315 submits the generated inventory certificate for signing by a hardware security module 320 that may be a dedicated hardware component of a factory provisioning server that safeguards cryptographic keys and implements cryptographic functions utilized in the factory provisioning process. In some embodiments, the factory certificate authority 315 may also specify a certificate name associated with a signing key that is maintained by the hardware security module 320. At 350, the hardware security module 320 utilizes the private key associated with the specified certificate in order to digitally sign the submitted inventory certificate, which includes the inventory of the factory installed hardware components of the IHS. The signed inventory certificate is then returned to the factory certificate authority 315 by the hardware security module 320.

Once the inventory certificate has been signed, at block 460 and at 355, the signed inventory certificate is transmitted from the factory certificate authority 315 to the factory provisioning application 305. As indicated in FIG. 3 at 357, the factory provisioning application 305 may store a copy of the signed inventory certificate. In some instances, the copy may be saved to a data store utilized in providing ongoing support of the IHS once it has been shipped and has been deployed by a customer. Once the IHS is deployed, embodiments may be utilized to augment this factory-provisioned inventory certificate with one or more delta certificates that each specify modifications to the factory-installed hardware of the IHS.

At block 465 and at 360, the signed inventory certificate is than loaded to the assembled IHS. As indicated in FIG. 3, in some embodiments, the signed inventory certificate may be uploaded to a remote access controller 310 of the assembled IHS, such that the signed inventory certificate may be stored to a nonvolatile memory or other persistent storage that is accessible by the remote access controller 310 independent from the operating system of the IHS. In other embodiments, the signed inventory certificate may be uploaded without reliance on the remote access controller to another non-volatile memory of the IHS.

Some embodiments may continue, at 365, with the validation of the signed inventory certificate by the remote access controller 310. Using the private key from the generated keypair, at block 470, the remote access controller decrypts the signature included by the remote access controller in the CSR and confirms that the inventory information included in the signed inventory certificate matches the inventory information that was submitted in the certificate signing request, thus validating the integrity of the generation of the signed inventory certificate. At block 472, the remote access controller confirms that the inventory included in the signed inventory certificate is valid and, at 370, the remote access controller 310 confirms the validity of the inventory certificate with a notification to the factory provisioning application 305.

With the generation and validation of the signed inventory certificate completed, embodiments continue, additional factory provisioning of the assembled IHS may be completed and, at block 475, the assembled IHS may be shipped from the factory to a customer, or to a location or individual designated by the customer. As described, once an IHS has been delivered, it may be modified over time to support particular computing tasks, such as to support a specific artificial intelligence or data storage system.

Figure 5:
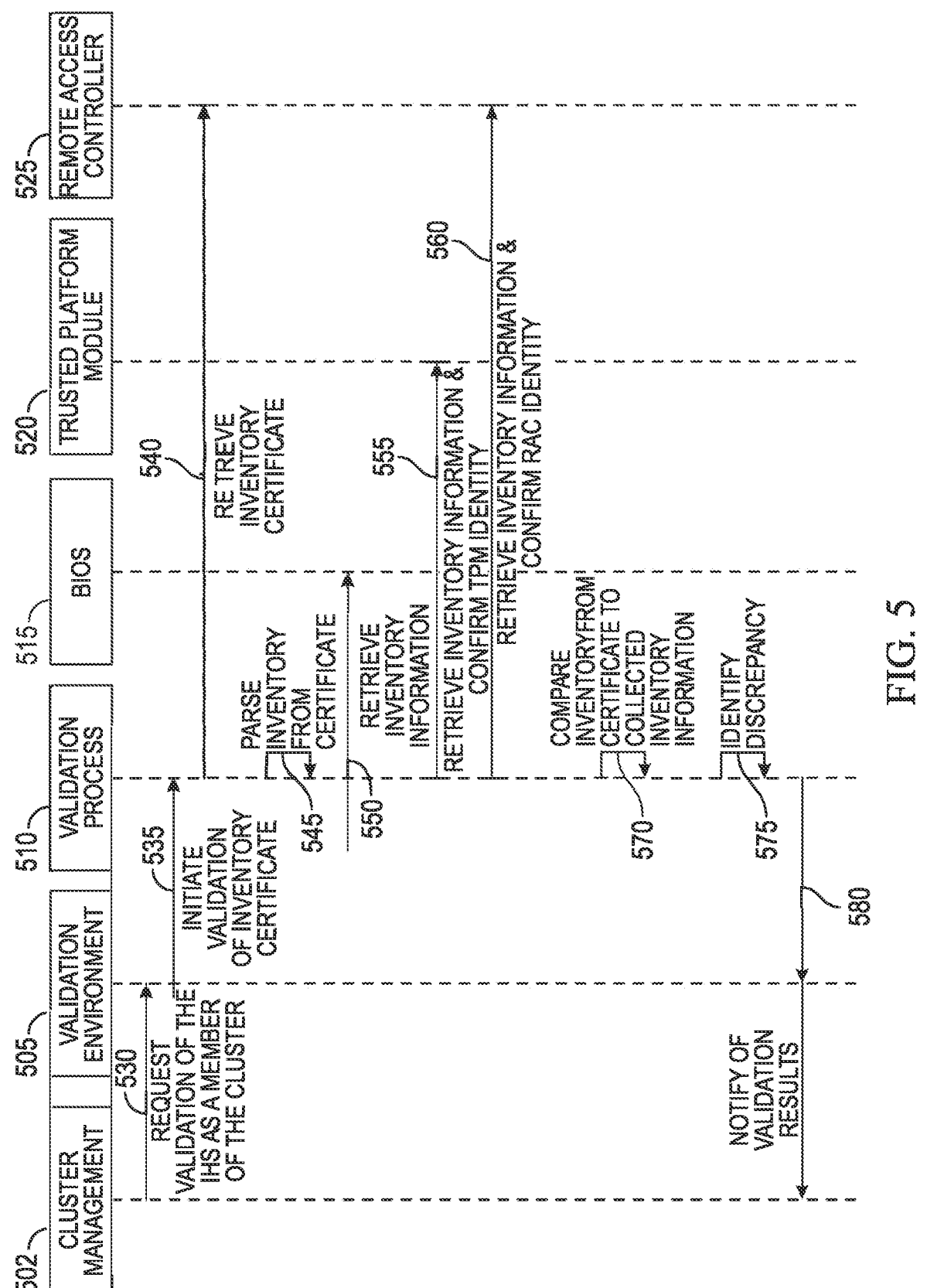
FIG. 5 is a swim lane diagram illustrating responsibilities of components of a system configured according to embodiments for the validation of the hardware components of the IHS, where this validation confirms the authenticity of the IHS as a member of a computing cluster that may generate identifiers used in collective management of the cluster.
Figure 6:
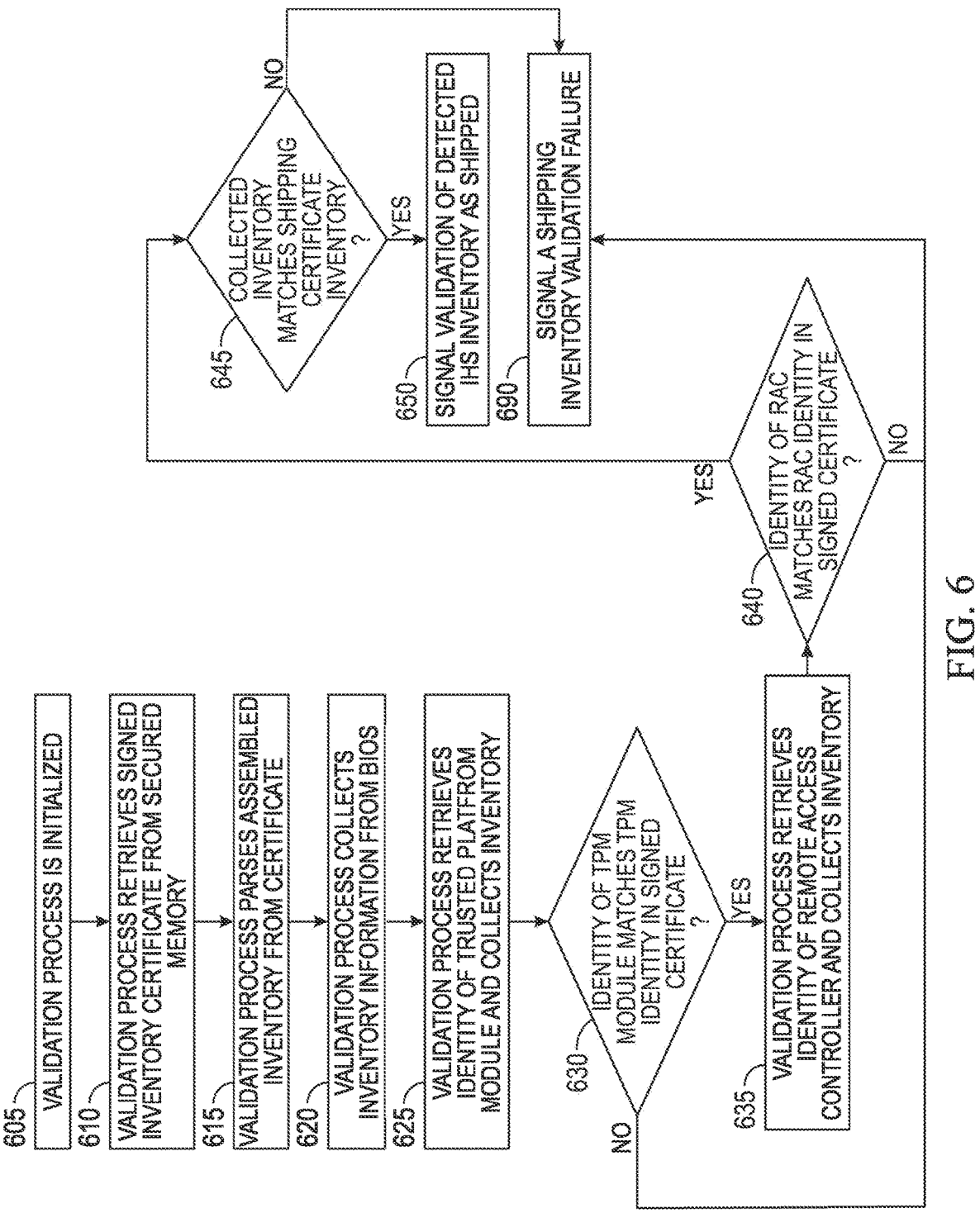
FIG. 6 is a flowchart describing certain steps of a method, according to some embodiments, for the validation of the hardware components of the IHS, where this validation confirms the authenticity of the IHS as a member of a computing cluster that may generate identifiers used in collective management of the cluster.

FIG. 5 is a swim lane diagram illustrating certain responsibilities of components of an IHS configured according to certain embodiments for use of an inventory certificate in the validation of the hardware components of the IHS, where this validation confirms the authenticity of the IHS as a member of a computing cluster that may participate in generating identifiers used in collective management of the cluster. FIG. 6 is a flowchart describing certain steps of a method, according to some embodiments, for use of an inventory certificate in the validation of the hardware components of the IHS. Embodiments may begin with the delivery of an IHS where the IHS has been assembled and provisioned according to the procedures set forth above. In particular, the delivered IHS has been provisioned at the factory to include a signed inventory certificate that specifies the factory installed hardware components of the IHS.

Upon receiving an IHS configured in this manner, the IHS may be unpacked, assembled and initialized by an administrator. In some instances, an IHS may be ready for immediate deployment by a customer. In other instances, an IHS may require further provisioning by customer before it is deployed, such as for operation within a particular data center. As such, in various instances, an IHS may be unpacked, assembled and initialized in order to deploy the IHS or to prepare it for further provisioning. In some instances, this provisioning of the IHS for use within a data center may include an administrator first ensuring that the IHS has been received with only factory-installed hardware.

As described, an IHS may be a member of a computing cluster that may be tasked and operated as a single entity, even though the computing cluster may include any number of IHSs and other hardware components that are configured for collective operation. In some instances, an IHS that is received for operation in a data center may have been designated for assignment to a cluster, whether as a replacement or an addition to an existing cluster, or as a member of a new cluster. In other scenarios, an IHS may be received, initialized and validated according to these procedures any number of times in order to validate the authenticity of hardware detected by the IHS before the IHS is eventually added to a computing cluster. When these validation procedures that are based on a factory-provisioned inventory certificate are utilized for purposes of cluster management, the authenticity and identity of the IHS may be established in order to confirm the IHS as an authentic member of a computing cluster.

At block 605, the IHS has been powered and a validation environment 505 that includes a validation process 510 is initialized. In some instances, the validation process 510 may be initialized as part of the initial provisioning of an IHS by a customer. In other instances, the validation process may be initialized by an administrator as part of an onboarding procedure for incorporating an IHS into data center operations, such as upon the IHS being added to a computing cluster. In some embodiments, the validation process may run within a pre-boot environment, such as a PXE (Preboot eXecution Environment) operating environment. In some embodiments, a PXE operating environment in which a validation process runs may be retrieved from a network location and may thus be executed using the processing and memory capabilities of the IHS. In some embodiments, a PXE operating environment may be retrieved using secure protocols, such as HTTPS, in order to assure the integrity of the operating environment instructions that are utilized. In some embodiments, a pre-boot operating environment in which the validation process runs may include an operating environment that is executed by the remote access controller 525 of the IHS based on validated firmware instructions. In these embodiments that utilize a pre-boot operating environment, the validation of the detected hardware components of the IHS is conducted prior to booting of the operating system of the IHS.

In some embodiments, the validation process may run as part of a diagnostic mode that is supported by an IHS. For instance, an IHS may support a diagnostic mode that may be initiated by a user or may be initiated automatically in response to detecting various conditions, such as the detection of a hardware component being added or removed from a computing cluster. In some embodiments, the diagnostic mode may involve re-booting the IHS to a diagnostic environment, while other embodiments may support diagnostic mode operations that run within the operating system of the IHS. Accordingly, some embodiments may support the described hardware validation procedures as a feature available within the operating system of the IHS. In such embodiments, the operating system may be configured to periodically conduct the described hardware validation procedures, such as on a daily or weekly basis. The operating system may likewise be configured to conduct the hardware validation procedures in response to a detected security notification, such as a notification that a process is attempting to access a protected resource. In some embodiments, the described validation procedures may be implemented remotely, such as via the described HTTPS protocols, where the remote validation procedures may rely both on information retrieved from the IHS via HTTPS and on remote information, such as information maintained by the manufacturer of the IHS or by an entity supporting the administration of the IHS.

As described, in some embodiments, the validation process 510 may be initiated in order to validate the IHS as a member of a computing cluster. As described in additional detail below, in embodiments, any member of a computing cluster may operate as the leader of the cluster with respect to the collective management of the cluster. As such, any of the members of the cluster may be designated for operation of cluster management functions 502. As part of these functions, the leader may detect or may receive notification of the addition or removal of a hardware component from the computing cluster. In some embodiments, upon addition of a new hardware component to a computing cluster, at 530, the leader may initiate validation of that new hardware component according to these IHS validation procedures that utilize a factory-provisioned inventory certificate. As described in additional detail below, in some embodiments, the leader may also initiate validation according to these validation procedures for each of the remaining members of the computing cluster upon detecting removal of a component from the cluster, such as in determining whether to re-identify the computing cluster according to a new external cluster identifier.

As indicated at 535 of FIG. 5, an inventory certificate validation process 510 is initiated within a validation environment 505 that may include a pre-boot environment, a diagnostic environment or other environment supporting the validation process. In some embodiments, the inventory certificate validation process 510 operates based on validated instructions, such as based on instructions that, when used to calculate a hash value, are confirmed to correspond to a value stored in an immutable memory of the IHS during its factory provisioning. In this manner, the inventory certificate validation process 510 may be added to the root of trust of the IHS. At block 610 and as indicated at 540, the inventory certificate validation process 510 retrieves the signed inventory certificate from the remote access controller 525, or from a persistent memory of the IHS. As described above, the factory provisioning process may include uploading a signed original inventory certificate to the remote access controller or to a persistent memory of the IHS. At block 615 and at 545, the inventory certificate validation process 510 parses the hardware inventory information from the signed inventory certificate. Using the public key provided in the signed inventory certificate, the inventory validation process 510 may confirm the integrity of the inventory information that is included in the signed inventory certificate, such as based on a challenge that confirms ownership of the corresponding private key by the remote access controller 525.

In some scenarios, the inventory certificate validation process 510 may commence by collecting an inventory of the detected hardware components of the IHS. In some instances, this collection of inventory information may be initiated earlier by the inventory certificate validation process, such as during initialization of the IHS. At block 620 and as indicated at 550, the inventory certificate validation process 510 may query the BIOS 515 of the IHS for an inventory of hardware components that have been detected by BIOS 515. At block 625 and as indicated at 555, the inventory certificate validation process 510 may retrieve additional hardware inventory information from a Trusted Platform Module (TPM) 520 of the IHS. In some instances, the TPM 520 may identify hardware components that are also identified by BIOS 515. However, in some instances, the TPM 520 may identify certain hardware components, such as secure memory modules, that are not identified by BIOS 515.

As described with regard to FIG. 2, a Trusted Platform Module may serve to establish an initial hardware root of trust in an IHS such that the hardware components within this root of trust operate using validated software instructions. Accordingly, in some embodiments, the inventory certificate validation process 510 may compare identity information for the detected TPM 520 against the TPM identity information that is parsed from the inventory certificate at block 545. In some instances, the detection of any discrepancies between the identity of the TPM specified in the inventory certificate and the identity reported by TPM 520 may result in terminating any further validation procedures.

At block 630, the validation process may confirm the identity of the detected TPM against the identity of the TPM reported in the signed inventory certificate. If the identity of the TPM is successfully validated, validation may continue at block 635. However, if the identity of the TPM is not validated, at block 690, the validation process may signal a core inventory validation failure since any discrepancies between the identity of the factory installed TPM and the TPM that has been detected signals a potential compromise in the root of trusted hardware components of the IHS.

At block 635 and as indicated at 560, the inventory certificate validation process 510 may retrieve additional hardware inventory and thermal information from a remote access controller 525 of the IHS. As with TPM 520, remote access controller 525 may provide redundant identification of some hardware components and may provide exclusive identification of other hardware components, such as internal memories, management controllers or logic units utilized by the remote access controller 525. As with TPM 520, in some embodiments, the inventory certificate validation process 510 may compare identity information for the detected remote access controller 525 against the remote access controller identity information that is parsed from the inventory certificate at block 545. In some instances, the detection of any discrepancies between the identity of the remote access controller specified in inventory certificate and the identity reported by remote access controller 525 may also result in terminating any further validation procedures.

At block 640, the validation process 510 may confirm the identity of the detected remote access controller against the identity of the remote access controller reported in the signed inventory certificate. If the remote access controller is successfully validated, validation may continue at block 645. Otherwise, if the identity of the remote access controller is not validated, at block 690, the inventory certificate validation process may signal a core inventory validation failure. As with the TPM, any discrepancies between the identity of the factory installed remote access controller and the remote access controller detected in the initialized IHS signals a potential compromise of the root of trust of the IHS.

The validation process 510 may retrieve additional inventory information from any other available data sources, such as directly from the processor of the IHS or from a chassis management controller of a chassis in which the IHS has been installed. Upon completion of the collection of the detected hardware components of the initialized IHS, at block 570, the inventory certificate validation process compares the collected inventory information of the detected components against the inventory information that is parsed from the signed inventory certificate. If the unique identifiers of the detected hardware components of the initialized IHS match the identifiers of the factory installed hardware components from the signed inventory certificate, at block 650 and 580, the inventory validation process 510 signals a successful validation of the detected hardware of the IHS as being factory-installed hardware, including providing notification of the successful validation to an IHS that has requested the validation as part of collective cluster management 502 operations. If no discrepancies are identified, members of a computing cluster are thus assured of the identity the IHS, and are also assured that the IHS is operating using only authentic hardware components, such as hardware components installed at the factory during manufacture of the IHS, with no missing or additional hardware components detected.

If any hardware components are detected that are not identified in the inventory from the certificate, at block 690, the validation process may signal an inventory validation failure. In some embodiments, an inventory validation failure will also be signaled if the validation process identifies is unable to detect components that are specified in the inventory certificate. In some embodiments, a validation failure may be signaled if factory-installed hardware components specified by the inventory certificate are not detected. In this manner, successful validation requires confirming that an IHS is operating using all of the factory-installed hardware, and no additional hardware.

Figure 7:
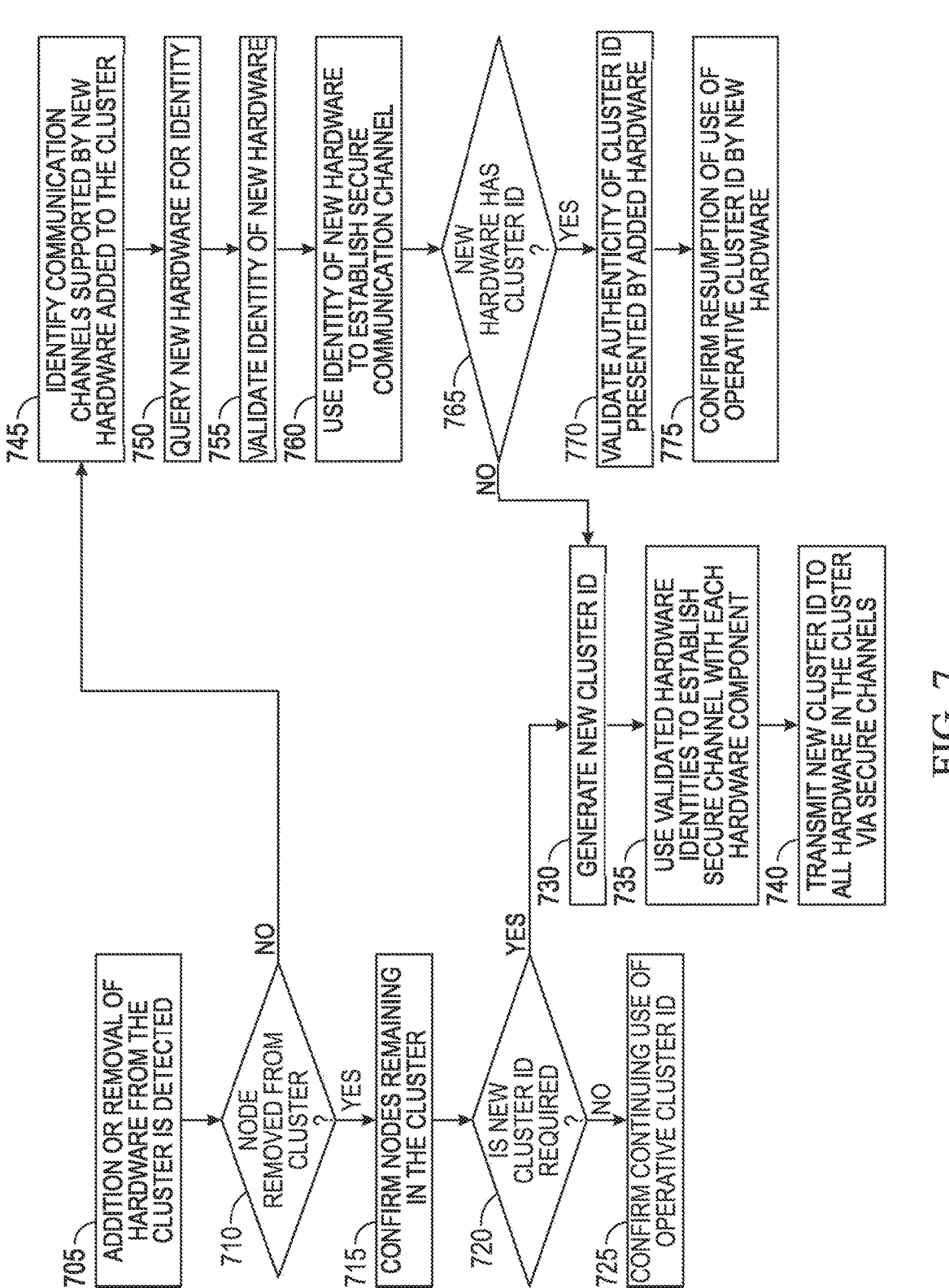
FIG. 7 is a flowchart describing certain steps of a method, according to some embodiments, for the validation of IHSs for generating identifiers used in collective management of a computing cluster.

FIG. 7 is a flowchart describing certain steps of a method, according to some embodiments, for the validation of IHSs for generating identifiers used in collective management of a computing cluster. Embodiments may begin, at 705, with the detection of a hardware component, such as an IHS 200, being added or removed from a computing cluster 100. As described, a computing cluster 100 may include any number of IHSs and/or other hardware components, such as networking hardware, that are grouped and collectively tasked and operated as a single, unitary computing unit. In some embodiments, the members of the computing cluster 100 may be logically, but not physically, grouped. In some embodiments, the members of the computing cluster 100 may be both logically and physically grouped. When physically grouped, the members of a computing cluster 100 may be physically linked by one or more physical communication pathways, such as via a PCIe switch fabric 160 that supports high-speed and high-bandwidth communications between the members of the computing cluster 100.

Accordingly, in some embodiments, the addition or removal of a component to a computing cluster 100 may be detected based on notifications issued via the switch fabric 160. Such notifications may indicate that a hardware component has been disconnected from the switch fabric 160, such as due to PCIe error messages resulting from attempts to deliver packets to this particular hardware component. In this same manner, the switch fabric 160 may report the coupling of a new PCIe hardware component to the fabric, or the re-coupling of a known hardware component. As described, an administrator may add or remove components from a computing cluster for a variety of reasons. In some instances, a hardware component may be temporarily removed from a computing cluster for repairs or upgrades, with the component being reinstalled in the same computing cluster once administration of the component has been completed.

In some embodiments, the addition or removal of a hardware component from a computing cluster 100 may be signaled by management systems that may be internal or external to the computing cluster 100. As described, an IHS 200 that may be a member of a computing cluster may include a remote access controller 255 that implements a variety of management functions for the IHS, including supporting remote management of the IHS. A remote access controller 255 may interface with remote management tools and/or rack-level management tools (e.g., a chassis management controller that implements sharing of rack-level resources by IHSs that are installed in the rack) in receiving notifications of hardware components being added or removed from a computing cluster.

Through one or more of these signaling pathways, a notification may be reported to any or all of the members of the computing cluster 100. In embodiments, any IHS 200 configured according to embodiments may operate cluster management 502 functions on behalf of all of the members of the cluster, such as through designation of that IHS as the leader of the cluster. As the leader of the computing cluster, an IHS may implement core operations of a cluster management API by which external systems may issue computing tasks to the cluster, and by which internal communications between the members of the computing cluster may be supported. When not designated as the leader, IHSs that are members of the computing cluster may support a limited version of the cluster management API for use by the leader in communicating with each IHS that is a member of the computing cluster. As required to continue ongoing collective management of the computing cluster, any IHS 200 configured according to embodiments may implement the core operations of a cluster management API and thus operate as the leader of the cluster. Accordingly, any member of the computing cluster 100 that detects the addition or removal of a member of computing cluster may report this change to the leader of the computing cluster via this cluster management API.

Based on information generated or received by the leader, at 710, the leader determines whether a component has been removed from computing cluster. Even though a single component may be designated as the leader of a computing cluster, embodiments may implement procedures for collective management of the computing cluster, such as in leaderless operations described in additional detail below. Accordingly, the leader of the computing cluster may issue various queries to the members of the computing cluster prior to concluding a hardware component has been added or removed from the computing cluster. For instance, in some scenarios, a notification received by the leader of a missing member of the computing cluster may not be due to any actual removal of that component, but instead due to a failure in a communication link between that component and another member of the computing cluster.

In scenarios, where a hardware component is determined to have indeed been removed from the computing cluster, at 715, the leader may utilize the cluster management API functions supported by each member of the computing cluster to confirm the manifest of components that remain as members of the cluster. For instance, the leader may initiate collective management procedures by which each member of the computing cluster confirms its status to all other members of the cluster. In this manner, the leader may generate a complete manifest of the computing cluster, where the manifest is valid only if every member of the computing cluster is recognized by the switch fabric 160, and by all of the other members of the computing cluster.

In some scenarios, the member of the cluster that is removed is the component the is operating as the leader. In some instances, removal of the leader may be detected directly by other members of the cluster, such as due to uncoupling of physical network connections between neighboring server IHSs. In other instances, removal of the leader may be detected by management tools, that may then issue notification received by one or more members of the computing cluster 100. In embodiments, any member of the cluster detecting removal of the leader and/or receiving notification of the leader's removal, may broadcast notification of the leader's removal to all other members of the computing cluster, such as through operations of the cluster management API that is supported by all members of the cluster.

Through reaching a consensus, the remaining members of the computing cluster may reach agreement that a leader has been removed, resulting in all of the members of the cluster transitioning to operating in a leaderless mode. While in leaderless mode, operations supported by the computing cluster 100 may continue without interruption, even with the reduced capabilities resulting from removal of the leader. As described, assignment of a cluster ID includes assignment of the cluster ID to all members of the computing cluster, such that each of the members of the cluster may respond to queries that are directed to the cluster using this cluster ID.

When a leader has been designated, member of the cluster may be configured to respond to received queries directed to the cluster by relaying them to the leader. When operating in leaderless mode, responses to queries that are received by a member of the cluster may be agreed through consensus via voting mechanisms supported by the cluster management API. In some instances, embodiments may delay election of a new leader and may continue using leaderless operations for a predefined interval to account for scenarios where the leader is being temporarily removed for administration, but will be returned to operation in the computing cluster. In such instances, the remaining members of the computing cluster continue use of the cluster ID during the leader's absence, such that re-installation of the leader does not require any changes to the operative cluster ID. In some embodiments, the remaining members of the cluster may operate in leaderless mode for any amount of time and may initiate operations for generating a new cluster ID, where operations are conducted via consensus between the members. In some embodiments, generating a new cluster ID may require election of a new leader.

Based on the remaining members of the computing cluster, at 720, the leader determines whether a new cluster ID (identification) is required by the cluster. As described, a computing cluster may be collectively tasked and operated as a single entity, despite the cluster being comprised of multiple hardware components. In support of such capabilities, the computing cluster may be identified and tasked according to a cluster ID that uniquely identifies the cluster. In some instances, removal of a component from a computing cluster fundamentally alters the capabilities of the cluster such that continuing operation of the cluster with the same cluster ID is now disadvantageous since the capabilities of the computing cluster have now changed and is thus a different computing cluster due to the removal of a non-redundant component of the cluster. In such scenarios, a new cluster ID is generated for the computing cluster in order to reflect the degraded capabilities of the computing cluster, such as a result of removal from the computing cluster of a specialized IHS that includes artificial intelligence processors not present in any other IHS of the computing cluster, or such as removal of a network switch 140 from the cluster.

However, in some scenarios, removal of a hardware component from a computing cluster may not require a new cluster ID. For instance, as described with regard to FIG. 1, a computing cluster 100 may include any number of storage sled IHSs 115*a-n* and/or other storage arrays 155 that provide bulk storage of data, including redundant data storage the replicates data across multiple different storage devices. In some instances, removal of such storage components does not outwardly affect the operation of a computing cluster. For example, removal of a storage sled may be part of a planned administrative operation that ensures no data is lost as a result of the removal, such as due to data redundancy across multiple storage sleds 115*a-n* that are members of the computing cluster. In such a scenario, the capabilities of the computing cluster may be unchanged with respect to supporting the same computational tasks as before, albeit with reduced data storage capacity.

If there are no changes to the capabilities of the computing cluster as a result of the removal, no change to the cluster ID by which the cluster is collectively tasked and managed is required. In such scenarios, at 725, the leader of the computing cluster uses the cluster management API to confirm the updated manifest of members of the computing cluster and to confirm operation of the computing cluster using the currently operative cluster ID. In this manner, the computing cluster is collectively managed in resolving the removal of a component of the cluster, while also maintaining the ongoing operations of the cluster without interruption.

As described, in some instances, a hardware component may be removed from a computing cluster in order to administer the component. In some instances, the administrative operation may have no impact on the computational capabilities of the component, such as replacing a liquid cooling coupling of a server IHS 200. Such administrative operations may also have no impact on the identity of that component. The server IHS 200 remains identical from the perspective of other members of the computing cluster. In other instances, the administrative operation may have a significant impact on the computational capabilities of the component, such as due to an upgrade to system memory 210 of an IHS or the addition of a graphics processor 235 that supports computational offloading by processor 205. Some of these administrative operations may have an impact on the identity of the IHS, while others do not.

In some instances, the administrative operation may change the identity of the IHS. For instance, in a server IHS 200, the motherboard, and thus all the components that are fixed to it, may be replaced. A motherboard replacement may include replacement of processors 205, remote access controller 255, system memory 210, a TPM module and/or various secured data storage devices, such as SPI Flash used to store highly protected boot code. In such instances, the root-of-trust of the IHS 200 has fundamentally changed to the point that the IHS 200 is a new device from the perspective of the other members of the computing cluster. In such scenarios, re-inserting the modified IHS into the same computing cluster 100 as before requires validation of this IHS as operating using authentic hardware, with the updated inventory for this IHS that is specified in its inventory certificate and any valid delta certificates used to identify this IHS within the computing cluster as a trusted hardware component.

In addition or in alternative to removing existing hardware from a computing cluster 100 for administration, in some instances new hardware may be added to a computing cluster. For instance, a new server IHS 200 may be added to a computing cluster to expand the capabilities of the cluster. In other instances, a new network switch 140 may be added to provide additional bandwidth for use by the computing cluster 100, such as through an additional switch fabric for use in communications between the members of the computing cluster 100.

As described, the detection of a new or otherwise unrecognized hardware component being coupled to the computing cluster 100 results in a notification to the leader of the cluster that is operating the API used in cluster management 502. However, the computing cluster 100 is unable to immediately establish whether the detected component is a new component, or is an updated version of a prior member of the cluster. Accordingly, upon detecting the coupling a new component to the cluster, at 710, the IHS that has been designated as supporting cluster management 502 operations triggers interrogation and identification of the new component.

Initially, at 745, the leader of the computing cluster identifies the communication channels that are supported by the new or otherwise unrecognized component. In some instances, these channels may include the switch fabric 160 that is in use by the computing cluster 100. Other in-line communication channels may be available for communications between members of a computing cluster, where the availability of these specific channels, such as a designated PCIe lane of the switch fabric 160 may be limited to administrative and/or management cluster operations, and not for operation of the cluster in completing assigned computing tasks. In some instances, various sideband communication channels may be available for cluster management 502 operations, such as sideband IHS management channels supported by a remote access controller 255 of an IHS 200.

Through one or more of these available channels, at 750, the leader of the computing cluster 100 interrogates the new hardware device in order to establish the identity of the hardware. As described, the component being coupled to the computing cluster 100 may be a new component that has never been part of this computing cluster, or may be a known component that was previously a member of the computing cluster. In some embodiments, identification of the added hardware component may be supported by the protocols through which the presence of the component was detected. For instance, when using a sideband management channels, I2C protocols may support queries for use in identifying a communication channel participant that has been added as member of a computing cluster. Similarly, the PCIe protocol of the switch fabric 160 may provide information identifying a detected component. Although such capabilities may serve to identify a detected component, this identification may only serve to identify the type of component that has been detected (e.g., a network switch, an server IHS 200) without validating the identity of the component as trusted, and thus authorized as a member of the computing cluster.

In some embodiments, the identity of a hardware component may be validated, at 755, based on the use of a factory-provisioned inventory certificate, such as described above, that specifies the factory-installed hardware of the component. In such embodiments, the IHS operating as the leader of the computing cluster 100 may initiate validation of the new or unrecognized IHS using such a factory-provisioned inventory certificate presented by the IHS, and any valid delta certificates that have been generated to authenticate modifications to the factory-installed hardware of an IHS. As described, an IHS 200 may operate a validation environment 505 that may receive requests for validation of the identity of the IHS, such as requests issued by the IHS providing cluster management 502 functions.

As described with regard to FIGS. 5 and 6, a validation process 510 of the IHS may be initiated and used in comparing the hardware that is detected by the IHS against the hardware inventory that is specified in the factory-provisioned inventory certificate. Through this validation process 510, the added IHS may be confirmed as operating using only authentic hardware. In addition, the identity of the IHS as a collection of the specific hardware components in the factory-provisioned inventory certificate is also confirmed. As with regard to determining the identity of a cluster, the identity of a component that is member of a computing cluster 100 may be used to represent the capabilities of that component such that significant changes to the capabilities of the component should result in a new identity for that component, thus requiring a new inventory certificate, or a delta certificate that augments the factory-provisioned inventory certificate. Embodiments may thus utilize a factory-provisioned inventory certificate to establish the identity of an IHS as a member of a computing cluster, where the identity of the IHS results from validation of the IHS as operating using authentic hardware.

As described, the added hardware component may be a new component, or may be a prior member of the computing cluster 100 that is being re-admitted to the cluster. When the added component is a previous member of the cluster, such as an IHS that has been temporarily removed from the cluster for administration, the identification of the component based on its factory-provisioned inventory certificate confirms that any changes made to the IHS do not include any changes to the hardware of the IHS (or at least any meaningful changes to hardware that is identified in the inventory certificate), and thus do not include changes to the capabilities of the IHS with respect to its participation in the computing cluster 100.

In scenarios where modifications have been made to the hardware of the IHS that was removed from a cluster and is now been re-included, validation of the hardware may now be made using the factory-provisioned inventory certificate and delta certificates that validate the modifications to the factory-installed hardware. In such scenarios the identity of the IHS is now different than when the IHS was previously a member of the computing cluster 100. In such instances, the IHS may be re-admitted to the computing cluster 100 based on this updated identity.

Once the identity of the added IHS has been validated as either a returning member or as a new member, at 760, the leader of the cluster providing cluster management 502 functions uses this confirmed identity of the IHS in order to establish a secure communication channel between the leader and the added IHS. As described above, a factory-provisioned inventory certificate is signed using a private key of a keypair that is generated and controlled exclusively by an IHS 200 that is configured according to embodiments. As part of identifying an IHS based on its validated hardware, challenges issued to the IHS may confirm its possession of the private key associated with the public key that is endorsed by the factory-provisioned inventory certificate. In embodiments, this public key that has been endorsed by the inventory certificate may be used by the leader of the computing cluster to establish a secure communication channel with the new or unrecognized hardware component. For instance, the public key may be used to establish a switch fabric 160 TLS session between the leader of the computing cluster and the added component. As described, some cluster management communications may be transmitted via the switch fabric 160 used in the operation of the cluster. In some embodiments, management of a the computing cluster maybe conducted via a dedicated PCIe lane of the switch fabric, where this channel is reserved for operations in support of the collective management of the computing cluster 100 by its members.

As indicated in FIG. 7, at 765, the secure channel is used by the leader of the computing cluster to determine whether the added hardware component is a prior member of the computing cluster, such that the component has been previously configured to operate using a cluster ID. In scenarios where the added component reports a cluster ID, at 770, the leader of the computing cluster 100 evaluates the validity of the cluster ID. As described, the added component may be a prior member of the cluster that was removed for administration, which may have resulted in the operative cluster ID for the computing cluster being updated to reflect the modified capabilities of the cluster. However, in some scenarios the cluster ID may have been retained on the basis that the capabilities of the computing cluster were not substantially changed by removal of this IHS that is now being re-installed as a member of the cluster.

Accordingly, in some instances, the cluster ID that is presented by the re-admitted hardware remains valid since this remains the operative cluster ID that is still in use by the computing cluster. In such instances, the returning IHS may be re-incorporated into the computing cluster while maintaining use of the operative cluster ID. At 775, the leader of the computing cluster confirms resumption of the returning IHS as a member of the computing cluster. In some embodiments, the leader may utilize the cluster management API to notify each member of the computing cluster of the updated manifest of members of the cluster. With the IHS re-introduced as a member of the computing cluster 100, operations supported by the computing cluster may continue without interruption while maintaining use of the operative cluster ID.

In some instances, the added component may be a new component or a component that has been modified significantly (e.g., motherboard replacement), and thus does not have a cluster ID. In other instances, the added component may be a prior member of the computing cluster, but the cluster ID presented by this component is no longer valid. As described, in some instances, removal of a component from a computing cluster may impact the capabilities of the computing cluster in a manner that warrants re-identifying the cluster according to a new cluster ID. In such instances, the cluster ID presented upon re-admitted component may thus no longer be the operative cluster ID in use by the computing cluster. In some scenarios, a component may present a cluster ID, but it pertains to a different computing cluster. In these scenarios, at 765, the leader of the computing cluster determines that a new cluster ID is required based on addition of the component.

As described, a new cluster ID may also be required, at 720, in scenarios where removal of a component from a computing cluster 100 significantly alters the capabilities of the cluster. In scenarios where a new cluster ID is warranted in response to the addition or removal of a component from the computing cluster, at 730, the leader of the computing cluster generates a new cluster ID for use in identifying this cluster. As described, the generated cluster ID may be used by every member of the computing cluster, with each member responding to this cluster ID in fulfilling computing tasks that are supported by the computing cluster. Once a communication directed at the computing cluster is received based on this cluster ID, the components of the cluster may interoperate via switch fabric 160 in responding to the communication, whether it be a delegated computing task or a query seeking information about the computing cluster.

In some embodiments, the cluster ID may be a unique value generated using the cryptographic capabilities of the IHS that has been designated as the leader of the computing cluster. In some embodiments, the cluster ID may be generated by the leader of the cluster based on unique information representing each of the hardware components that are members of the computing cluster. As described, each member of the computing cluster 100 may be uniquely identified in a variety of manners. For instance, some or all of the members of the computing cluster 100 may be assigned a unique and immutable identifier by its manufacturer. For instance, an IHS may be assigned a service tag or other alphanumeric unique value by its manufacturer, where this value may be used to manage various aspects of the IHSs operation.

In some embodiments, the leader of the computing cluster 100 may generate a unique identifier for the computing cluster by combining the unique identifiers of each of the members of the computing cluster. In some embodiments, the unique identifier for the computing cluster 100 may be a cryptographic key generated through operation of a key derivation function, where the inputs to the function are the unique identifiers of the respective members of the computing cluster. For instance, embodiments may generate a cryptographic key that serves as the identity computing cluster 100 by inputting unique identifiers of each of the sleds 105*a-n*, 115*a-n* and network equipment 140 that are members of the cluster into the key derivation function, where the identifiers of the members may be combined as a single input to the key derivation function, or may be iteratively used as inputs to the key derivation function. In some embodiments, the salt value that is used by the key derivation function may be a random value during the initial iteration of the key derivation function, and any for subsequent iterations of the key derivation function, the prior cluster identifier may be used as the salt value. Other embodiments may utilize various other functions supported by the cryptographic capabilities of an IHS 200 that utilize the unique identifiers of the computing cluster members as inputs and generates as an output a unique value for use in identifying the computing cluster 100.

As described, in some embodiments, the members of a computing cluster may be identified based on factory-provisioned inventory certificates that specify the factory-installed hardware of an individual hardware device, such as a server IHS 200. Embodiments may identify members of the computing cluster 100 based on their factory-provisioned inventory certificate. As described, an inventory certificate may include a digital signature that is generated based on unique identifiers of some or all of the factory-installed hardware of an IHS 200. As such, this digital signature is thus a value that uniquely identifies an IHS, and that can be validated as an authentic representation of the valid hardware of an IHS. In some embodiments, these digital signatures from the inventory certificates of IHSs that are members of the computing cluster may be used as inputs to the function used to generate a unique identifier for the cluster. In particular, the digital signature of each member may be an input to a key derivation function that generates an output based on a mathematical combination of each of these digital signatures.

In some embodiments, the identifiers of cluster members that are used as inputs to the key derivation function may be specified through operators that specify wither an identifier of a member of the cluster is always included as in input, or whether the identifier of the member is instead conditionally included as an input. For instance, in a computing cluster that includes three members, the inputs to the key derivation function may be unconditionally included as inputs (specified by operator: A) to the key derivation function, with all of the cluster member identities used in forming the cluster identity. For instance, this key derivation function utilizing unconditional inputs may be represented as follows: Cluster ID=f(Member1_ID Δ member2_ID Δ member3_ID).

In some embodiments, cluster member identities may be conditional inputs to the key derivation function used in generating the cluster identity. As described, certain hardware components may be occasionally added and removed from the computing cluster. In some scenarios, some particular components may be regularly added and removed from the same computing cluster. Accordingly in a scenario where a network switch is occasionally added and removed from a computing cluster, the computing cluster may be configured for operation using a key derivation function where the input for this network switch is a conditional input (specified by operator: ○) to the function. In the scenario where the network switch is designated as a conditional input to the cluster identifier, the removal of that network switch from the cluster does not preclude use of the key derivation function with the identifiers of the other members as inputs. For instance, a function for generating a cluster ID where the unique identifier of each member is conditionally included may be represented as follows: Cluster ID=f (Member1_ID ○ member2_ID ○ member3_ID). Embodiments may utilize other functions, such as bitwise logical combinations (e.g., &, |), that mathematically combine identifiers for each of the members in generating a cluster identifier.

In some computing clusters, only some of the members may include factory-provisioned inventory certificates. Accordingly, in some embodiments, the mathematical function used to generate a cluster identifier may utilize different types of identifiers that are available for each of the members of the computing cluster 100. As described, an IHS 200 according to embodiments may include a factory-provisioned inventory certificate. However, other types of components that may be members of a computing cluster 100, such as a power supply unit 135 or a network switch 140, may not include a inventory certificate and may instead rely on a factory assigned alphanumeric value for identification purposes, such as a machine identifier (MCID) or network endpoint identifier. In some embodiments, this identifier may be an identifier of trusted component of the component, such as an immutable unique identifier of a remote access controller 255 or TPM that anchors the root of trust of hardware components for a member of the computing cluster.

In light of the different types identifiers that may be available for each member of the computing cluster, the inputs to the function that are used to generate the cluster identifier may include inventory certificate identifiers (e.g., digital signature generated from identifiers of factory-installed hardware) and may also include these other types of unique identifiers, such as machine IDs and root-of-trust identifiers, for members of the computing cluster that do not include an inventory certificate. In this manner, the generation of a cluster identifier output may utilize various types of available identifiers as inputs to the key derivation function, where individual inputs may be unconditionally or conditionally included as inputs to the key derivation function.

As described, in some instances, a new cluster identifier may be generated for a computing cluster upon addition of certain hardware to the computing cluster, such as IHSs or other hardware providing non-redundant or otherwise new functionality within the cluster. However, in some scenarios, a computing cluster may be defined during factory-provisioning of the members of the cluster, such as in a scenario where the cluster includes multiple server IHSs 200 that may be assembled specifically for operation within a computing cluster and may thus be factory provisioned with a cluster ID using the procedures set forth herein, such as using the described functions that generate a cluster ID based on identifiers of each of the server IHSs. In such embodiments, the factory provisioning capabilities described above for use in generating a signed inventory certificate may also be used to generate a factory-signed certificate for attestation of the cluster identity key that is generated using the key derivation function and that has been assigned and associated with the cluster collectively and also with each of the individual members of the computing cluster 100.

Using this factory-signed cluster identity certificate, the validity of a cluster ID that is presented by a cluster may be confirmed by other systems. In some scenarios, a system may confirm the authenticity of a cluster identifier endorsed by a cluster identity certificate through queries to the certificate authority that generated the certificate. Since the cluster ID is an amalgamation of identifiers of some or all of the members of the computing cluster, validation of this signed cluster identity certificate also serves to validate that this cluster ID has been generated based on genuine components with identifiers that can also be validated as authentic, such as using individual factory-provisioned inventory certificates that may be used to authenticate the individual component and the identifier of the component that is used as an input to the key derivation function used to generate the cluster ID.

In some embodiments, factory-provisioned computing clusters may be augmented with additional components, such as by adding a network switch or a specialized IHS to a cluster of server IHSs 200. In such embodiments, the use of the factory-signed identifier of the computing cluster may be maintained, while still incorporating the identifier of the added network switch into a new cluster ID that may be used while the network switch remains part of the computing cluster 100. For instance, a signed cluster ID generated using a function based on the identifiers of three member IHSs may be used as input along with the identifier of the added network switch (member4_ID) to generate a new Cluster ID as follows: Cluster ID=f((Member1_ID $\Delta$ member2_ID $\Delta$ member3_ID) $\bigcirc$ member4_ID). If and when the network switch is removed from the computing cluster, the computing cluster may revert to use of the factory provisioned cluster ID which remains valid as long as the underlying identifiers of each member (e.g., an inventory certificate) remains unchanged.

Once a new cluster ID has been generated, at 735, the leader of the computing cluster 100 uses the identity information for each member of the cluster to establish a secure communication channel by which the updated cluster ID is transmitted to each member. As described, the identity of each IHS 200 that is a member of a computing cluster 100 may be based on the validated inventory of that IHS, as specified in the factory-provisioned inventory certificate. Through validation of the identity of an IHS, control of the keypair endorsed by the inventory certificate may be confirmed, such that the public key of this keypair may be used to establish a secure for transmission of the updated cluster ID to the IHS. In some embodiments, the functions of the cluster management API by which an updated cluster ID may transmitted to an IHS may be disabled unless a secured communication channel has been used to invoke these functions. Through such measures, members of the computing cluster are protected from malicious or erroneous assignment of invalid cluster IDs to a component of a computing cluster.

Using these secured channels, at 740, the designated leader of the computing cluster transmits the cluster ID to each member of the cluster. Even though the need for a new cluster ID is based on the addition or removal of a single component, all of the members of the computing cluster must be notified of the modification to the cluster ID. This updated cluster ID may then be used by the cluster leader and by all members of the computing cluster to notify other systems of the availability of the reconfigured computing cluster, now operating based on the updated cluster ID in reflection of the modified capabilities of the computing cluster relative to the capabilities prior to the modification It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A first Information Handling System (IHS) that is a member of a compute cluster, the first IHS comprising:
   one or more processors; and
   one or more memory devices coupled to the one or more processors, the one or more memory devices configured with stored computer-readable instructions that, upon execution by the processors, cause cluster management functions of the first IHS to:
      determine when addition of a second IHS as a member of the compute cluster requires an update to a cluster identifier that is used to task the compute cluster;
      when an update to the cluster identifier is required, generate an updated cluster identifier, wherein the generated update to the cluster identifier comprises an amalgamation of identifiers of each member of the compute cluster; and
      transmit the updated cluster identifier to the second IHS.

2. The first IHS of claim 1, wherein the cluster identifier used to task the compute cluster is used to collectively identify all members of the compute cluster.

3. The first IHS of claim 1, wherein the updated cluster identifier is generated through inputs to a key derivation function, and wherein the inputs comprise the identifiers of each member of the compute cluster.

4. The first IHS of claim 3, wherein a plurality of operators specify whether the identifier of each member of the compute cluster is used as an input to the key derivation function.

5. The first IHS of claim 4, wherein the operators specify an identifier of a member of the compute cluster as an unconditional input to the key derivation function used to generate the updated cluster identifier.

6. The first IHS of claim 4, wherein the operators specify an identifier of a member of the compute cluster as a conditional input to the key derivation function used to generate the updated cluster identifier.

7. The first IHS of claim 1, wherein the identifiers of each member of the compute cluster comprise unique identifiers assigned by a manufacturer of each respective member of the compute cluster.

8. The first IHS of claim 1, wherein the identifiers of each member of the compute cluster comprise unique identifiers specified in a factory-provisioned certificate that specifies factory-installed hardware of each respective member of the compute cluster.

9. The first IHS of claim 8, wherein the identifiers specified in the factory-provisioned certificate that specifies factory-installed hardware of each respective member comprise a digital signature generated based on identifiers of factory-installed hardware of the respective member of the compute cluster.

10. The first IHS of claim 9, wherein the digital signature is signed by a manufacturer of the respective member of the compute cluster.

11. The first IHS of claim 10, wherein the certificate comprises a public key of a keypair generated by the respective member of the compute cluster, wherein the public key is endorsed by the manufacturer and used to validate the identifiers of each respective member of the compute cluster.

12. The first IHS of claim 1, further comprising a remote access controller comprising one or more logic units and further comprising one or more memory devices configured to store computer-readable instructions that, upon execution by the logic units, cause the remote access controller to generate an indication of the addition of the second IHS to the compute cluster.

13. The first IHS of claim 1, wherein the update to the cluster identifier is required due to upgraded capabilities of the compute cluster due to the addition of the second IHS.

14. A method for management of a computing cluster by a first Information Handling System (IHS) that is a member of the computing cluster, the method comprising:

determining when addition of a second IHS as a member of the computing cluster requires an update to a cluster identifier that is used to task the computing cluster;

when an update to the cluster identifier is required, generating an updated cluster identifier, wherein the generated update to the cluster identifier comprises an amalgamation of identifiers of each member of the computing cluster; and transmitting the updated cluster identifier to the second IHS.

15. The method of claim 14, wherein the cluster identifier used to task the computing cluster comprises a unique identifier used to collectively identify all members of the computing cluster.

16. The method of claim 14, wherein the updated cluster identifier is generated through inputs to a key derivation function that comprises the identifiers of each member of the computing cluster, and wherein a plurality of operators specify whether the identifier of each member of the computing cluster is used as in input to the key derivation function.

17. The method of claim 16, wherein the operators specify an identifier of a member of the computing cluster as an unconditional input to the key derivation function used to generate the updated cluster identifier, and wherein the operators specify an identifier of a member of the computing cluster as a conditional input to the key derivation function used to generate the updated cluster identifier.

18. A computer-readable storage device configured with instructions stored thereon for management of a compute cluster by a first Information Handling System (IHS) that is a member of the compute cluster, wherein execution of the instructions by one or more processors of the first IHS causes the one or more processors to:

determine when addition of a second IHS as a member of the compute cluster requires an update to a cluster identifier that is used to task the compute cluster;

when an update to the cluster identifier is required, generate an updated cluster identifier, wherein the generated update to the cluster identifier comprises an amalgamation of identifiers of each member of the compute cluster; and transmit the updated cluster identifier to the second IHS.

19. The computer-readable storage device of claim 18, wherein the cluster identifier used to task the compute cluster comprises a unique identifier used to collectively identify all members of the compute cluster.

20. The computer-readable storage device of claim 18, wherein the update to the cluster identifier is required due to upgraded capabilities of the compute cluster due to the addition of the second IHS.

\* \* \* \* \*